(12) United States Patent
Asai

(10) Patent No.: US 7,676,057 B2
(45) Date of Patent: Mar. 9, 2010

(54) INFORMATION PROCESSING DEVICE

(75) Inventor: Daisuke Asai, Seto (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 880 days.

(21) Appl. No.: 11/502,418

(22) Filed: Aug. 11, 2006

(65) Prior Publication Data

US 2007/0035776 A1  Feb. 15, 2007

(30) Foreign Application Priority Data

Aug. 11, 2005  (JP) .............................. 2005-233803

(51) Int. Cl.
  *G06K 9/00* (2006.01)
  *H04N 1/40* (2006.01)
(52) U.S. Cl. ...................................... 382/100; 358/3.28
(58) Field of Classification Search ................. 382/100, 382/232; 713/176, 179; 283/72, 74–81, 283/85, 93, 113, 901, 902; 370/522–529; 358/3.28; 380/51, 54, 210, 252, 287; 348/461, 348/463; 375/130

See application file for complete search history.

(56) References Cited

U.S. PATENT DOCUMENTS 6,567,533 B1 * 5/2003 Rhoads ....................... 382/100

FOREIGN PATENT DOCUMENTS

JP  11-298717  10/1999

* cited by examiner

*Primary Examiner*—Abolfazl Tabatabai
(74) *Attorney, Agent, or Firm*—Banner & Witcoff, Ltd.

(57) ABSTRACT

There is provided an information processing device which comprises a transparency adjustment unit to adjust transparency of a watermark image which is to be added to a main image to prepare data of a first image having first transparency and data of a second image having second transparency, wherein each of the first and second images corresponds to the watermark image and the first transparency of the first image is higher than the second transparency of the second image. The information processing device further comprises an overlap processing unit to generate data of an overlap image of the main image, the first image and the second image such that the second image, the main image and the first image overlap with each other in bottom-to-top order.

6 Claims, 9 Drawing Sheets

INFORMATION PROCESSING DEVICE

CROSS-REFERENCE TO RELATED APPLICATION

This application claims priority under 35 U.S.C. §119 from Japanese Patent Application No. 2005-233803, filed on Aug. 11, 2005. The entire subject matter of the application is incorporated herein by reference.

BACKGROUND

1. Technical Field

Aspects of the present invention relate to an information processing device having a watermark printing function.

2. Related Art

Printer drivers having a watermark printing function are widely used. Through the watermark printing function, data of a watermark image (e.g., watermark letters) can be added to data of a main image (e.g., a document) to be printed. For example, an indication "Confidential", "Important", "Urgent" or "No Copy" is added on a document to be printed so as to attract the attention of readers of the document. An example of a printing device having the watermark printing function is disclosed in Japanese Patent Provisional Publication No. HEI 11-298717.

In general, the watermark printing function includes a background mode and a transparent mode. FIGS. 9B and 9C illustrate examples of an overlap image of a main image 10M and a watermark image 10W (see FIG. 9A) printed in the background mode and transparent mode, respectively. In the background mode, the main image 10M is written on the watermark image 10W (see FIG. 9B). Since in this case the watermark image 10W is covered with the main image 10M, there are cases where readers of the main image (e.g., a document) hardly recognize the watermark image 10W (i.e., a word "Copy") depending on the size of the watermark image 10W.

As shown in FIG. 9C, in the transparent mode, data of the watermark image 10W undergoes a process for giving transparency to the watermark image 10W, and thereafter the watermark image data which has undergone the transparency process is overlaid on the data of the main image 10M. Since the watermark image has undergone the transparency process, a reader of the overlap image shown in FIG. 9C is able to recognize both of the main image and the watermark image in an overlap portion between the main image and the watermark image. However, in the transparent mode, a part of the watermark image not overlapping with the main image also undergoes the transparent process. Therefore, readers of the overlap image shown in FIG. 9C may feel that the entire watermark image is light and difficult to recognize.

SUMMARY

Aspects of the present invention are advantageous in that an information processing device, having a watermark printing function and capable of forming a clear watermark image even in a transparent mode, is provided.

BRIEF DESCRIPTION OF THE ACCOMPANYING DRAWINGS

DETAILED DESCRIPTION

General Overview

Figure 1:
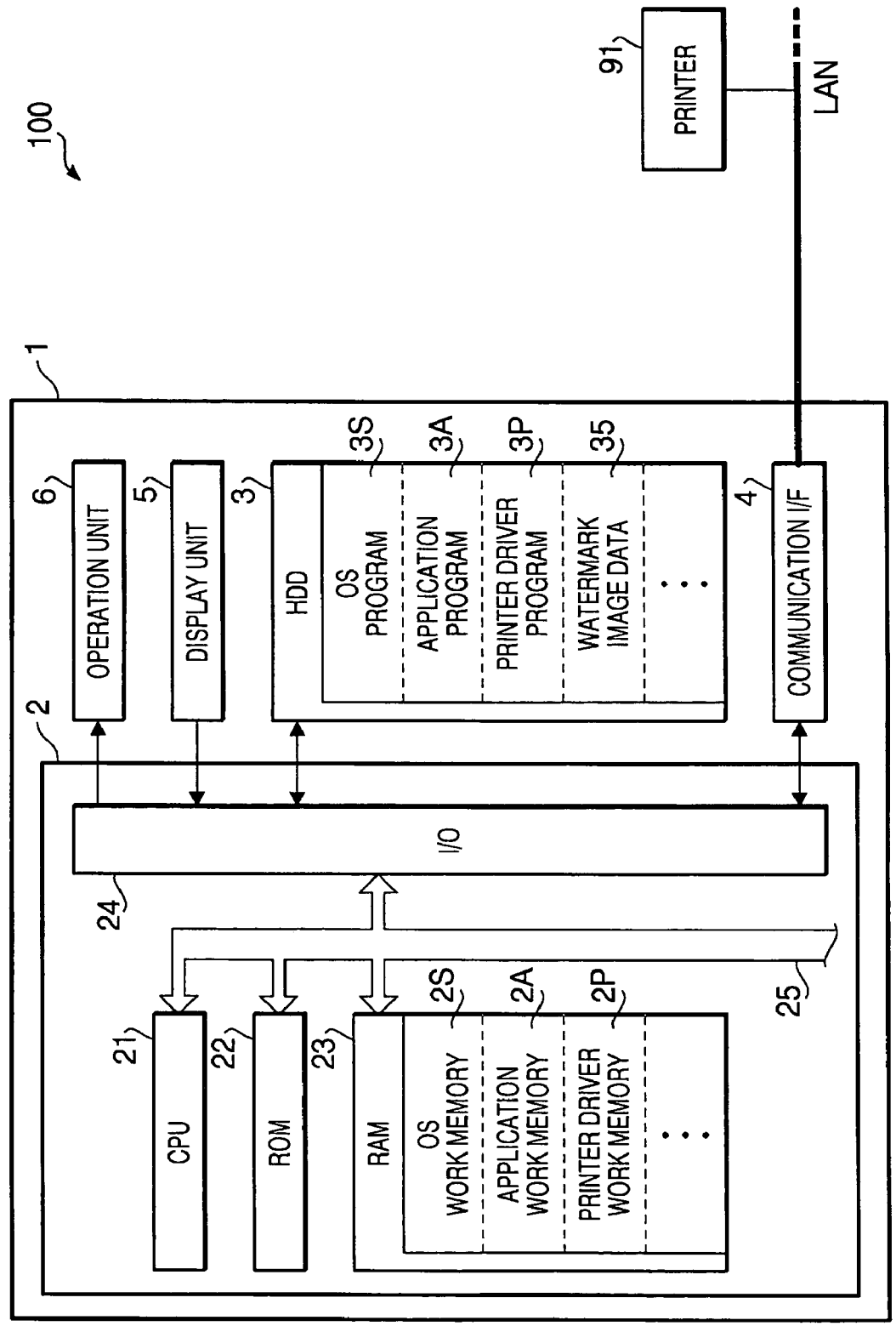
FIG. 1 illustrates a printing system in which a PC is connected to a printer through a LAN.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided an information processing device which comprises a transparency adjustment unit to adjust transparency of a watermark image which is to be added to a main image to prepare data of a first image having first transparency and data of a second image having second transparency, wherein each of the first and second images corresponds to the watermark image and the first transparency of the first image is higher than the second transparency of the second image. The information processing device further comprises an overlap processing unit to generate data of an overlap image of the main image, the first image and the second image such that the second image, the main image and the first image overlap with each other in bottom-to-top order from below upward.

By thus generating the overlap image such that the second image, the main image and the first image overlap with each other in this order from bottom-to-top, a following property of the overlap image can be achieved. In an overlap part of the main image and the watermark image, the main image is covered with the first image having relatively high transparency. Therefore, in the overlap part, both of the main image and the watermark image are recognizable as in the case of the transparency mode. In a non-overlap part where the watermark image does not overlap the main image, an image having higher density is reflected (i.e., the second transparency appears on the non-overlap part) as in the case of the background mode. Accordingly, it is possible to obtain the overlap image (to be printed) of which the watermark image is light in the overlap part and dark in the non-overlap part. Both of the main image and the watermark image can be clearly recognizable in the overlap image.

In at least one aspect, the information processing device further comprises a transmission unit to transmit the data of the overlap image to an external printer through a network.

In at least one aspect, the second image having the second transparency is equal to the watermark image of whichever transparency is not processed by the transparency adjustment unit.

Since in this case adjustment of transparency for the second image can be omitted, a watermark printing process can be simplified.

In at least one aspect, the information processing device further comprises an operation unit to accept a user input and a watermark image setting unit to change data of the first transparency of the first image in accordance with the user input through the operation unit.

Such a configuration enables a user to adjust the transparency of the first image to a desirable value. Since in this case only adjustment of the first transparency is allowed, the configuration of the watermark image setting unit can be simplified.

In at least one aspect, the information processing device further comprises an operation unit to accept a user input and a watermark image setting unit to change data of the first transparency of the first image and the second transparency of the second image in accordance with the user input through the operation unit.

Such a configuration enables a user to adjust both of the first transparency of the first image and the second transparency of the second image to desirable values so that both of the entire watermark image and the main image can be recognizable in the overlap image.

According to another aspect of the invention, there is provided a computer usable medium having computer readable instructions stored thereon, which, when executed by a computer, are configured to adjust transparency of a watermark image which is to be added to a main image to prepare data of a first image having first transparency and data of a second image having second transparency, wherein each of the first and second images corresponds to the watermark image and the first transparency of the first image is higher than the second transparency of the second image; and to generate data of an overlap image of the main image, the first image and the second image such that the second image, the main image and the first image overlap with each other in bottom-to-top order.

By thus generating the overlap image such that the second image, the main image and the first image overlap with each other in this order from bottom-to-top, a following property of the overlap image can be achieved. In an overlap part of the main image and the watermark image, the main image is covered with the first image having relatively high transparency. Therefore, in the overlap part, both of the main image and the watermark image are recognizable as in the case of the transparency mode. In a non-overlap part where the watermark image does not overlap the main image, an image having higher density is reflected (i.e., the second transparency appears on the non-overlap part) as in the case of the background mode. Accordingly, it is possible to obtain the overlap image (to be printed) of which watermark image is light in the overlap part and dark in the non-overlap part. Both of the main image and the watermark image can be clearly recognizable in the overlap image.

In at least one aspect, when the instructions are executed by the computer, the instructions are further configured to transmit the data of the overlap image to an external printer through a network.

In at least one aspect, the second image having the second transparency is equal to the watermark image of which every transparency is not adjusted.

Since in this case adjustment of transparency for the second image can be omitted, a watermark printing process can be simplified.

In at least one aspect, when the instructions are executed by the computer, the instructions are further configured to accept a user input and to change data of the first transparency of the first image in accordance with the user input.

Such a configuration enables a user to adjust the transparency of the first image to a desirable value. Since in this case only adjustment of the first transparency is allowed, the configuration of the watermark image setting unit can be simplified.

In at least one aspect, when the instructions are executed by the computer, the instructions are further configured to accept a user input and to change data of the first transparency of the first image and the second transparency of the second image in accordance with the user input.

Such a configuration enables a user to adjust both of the first transparency of the first image and the second transparency of the second image to desirable values so that both of the entire watermark image and the main image can be recognizable in the overlap image.

Embodiment

Hereafter, an embodiment according to the invention will be described with reference to the accompanying drawings.

FIG. 1 illustrates a printing system 100 in which a PC (Personal Computer) 1 is connected to a printer 91 through a LAN (Local Area Network). In FIG. 1, a block diagram of a control system of the PC 1 is also illustrated. In the printing system 100, the printer 91 executes a printing process when receiving a print command from the PC 1. As shown in FIG. 1, the PC 1 has an HDD (Hard Disk Drive) 3 storing a printer driver program 3P functioning, when executed by a CPU 21, as a printer driver 8P (see FIG. 2). The printer driver 8P has a watermark printing function which is described in detail below.

Figure 2:
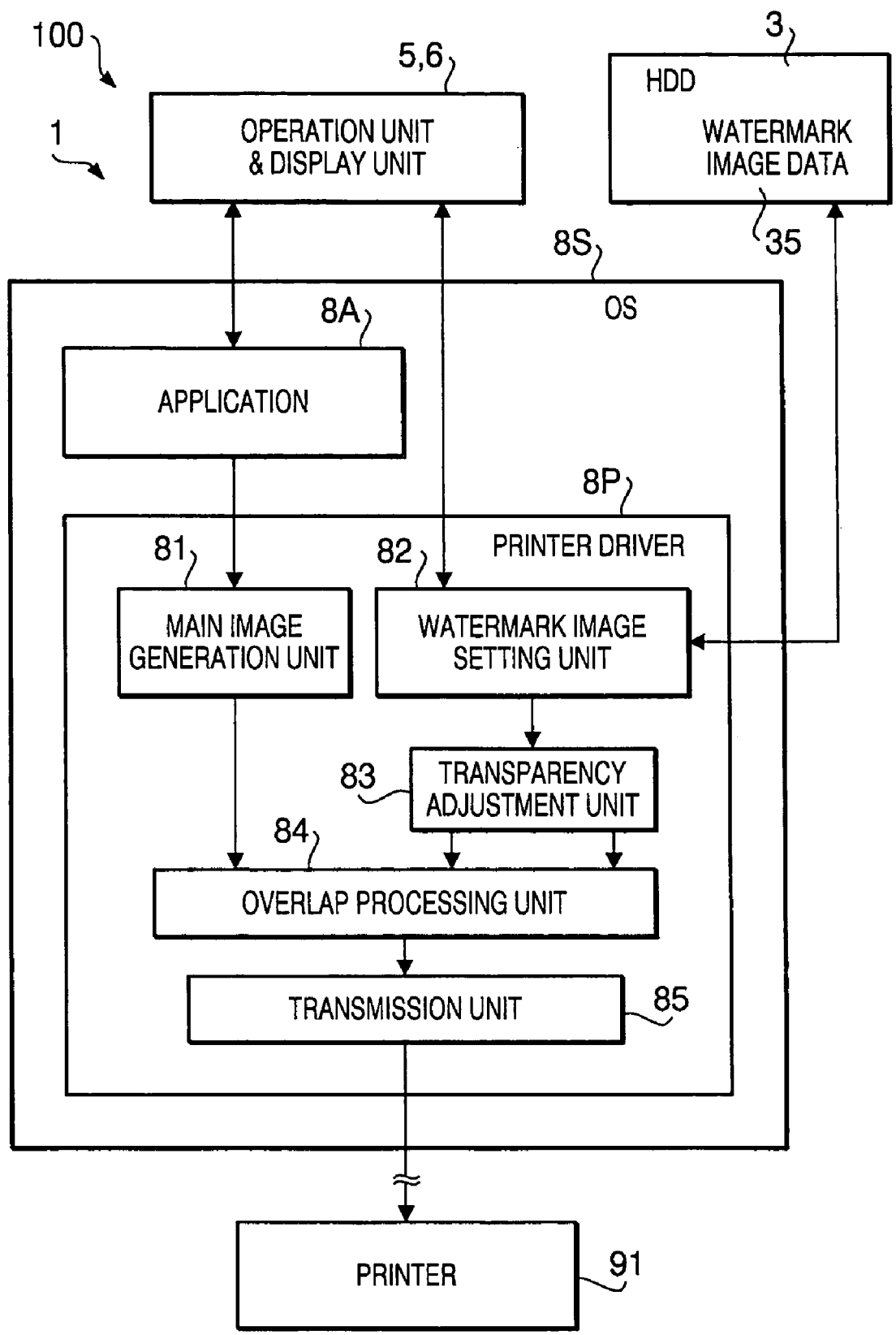
FIG. 2 is a functional block diagram concerning an OS and a printer driver running on the PC shown in FIG. 1.

As shown in FIG. 1, the PC 1 includes the HDD 3, a communication interface (I/F) 4, a display unit 5, an operation unit 6 and a control unit 2. The HDD 3 stores an OS program 3S functioning as an OS (operating system) 8S, an application program 3A functioning as an application 8A, and the printer driver program 3P (see FIG. 2). The HDD 3 further stores watermark image data 35 used for the watermark printing function. The communication interface 4 functions as a network adapter which interfaces the PC 1 with a device (e.g., the printer 91) through the LAN. FIG. 2 is a functional block diagram concerning the OS 8S and the printer driver 8P.

The display unit 5 is, for example, a CRT or an LCD. The operation unit 6 includes a pointing device (e.g., a mouse) and a keyboard. The control unit 2 includes the CPU 21, a ROM 22, a RAM 23 and an input/output interface 24, which are connected to each other via a bus 25. The CPU 21 executes programs stored in the HDD 3 to control the functions of the PC 1. The OS program 3P is executed under control of the CPU 21 using an OS work memory 2S assigned in the RAM 23. The application program 3A and the printer driver program 3P are executed under control of the CPU 21 using an application work memory 2A and a printer driver work memory 2P assigned in the RAM 23.

The printer 91 is communicatably connected to the PC 1 through the LAN. The printer 91 executes a printing process in accordance with commands transmitted from the printer driver 8P running on the PC 1. Although in this embodiment the printer 91 is connected to the PC 1 via the LAN, the printer 91 may be directly connected to the PC 1 through a parallel port or a USB (Universal Serial Bus) port.

Hereafter, a print process and a setting process executed by the printer driver 8P are explained. The printer driver 8P is a program module to generate print data in accordance with settings concerning functions of the printer 91, and to transmit the print data to the printer 91. As shown in FIG. 2, the printer driver 8P includes a main image generation unit 81, a watermark image setting unit 82, a transparency adjustment unit 83, an overlap processing unit 84, and a transmission unit 85.

Figure 3:
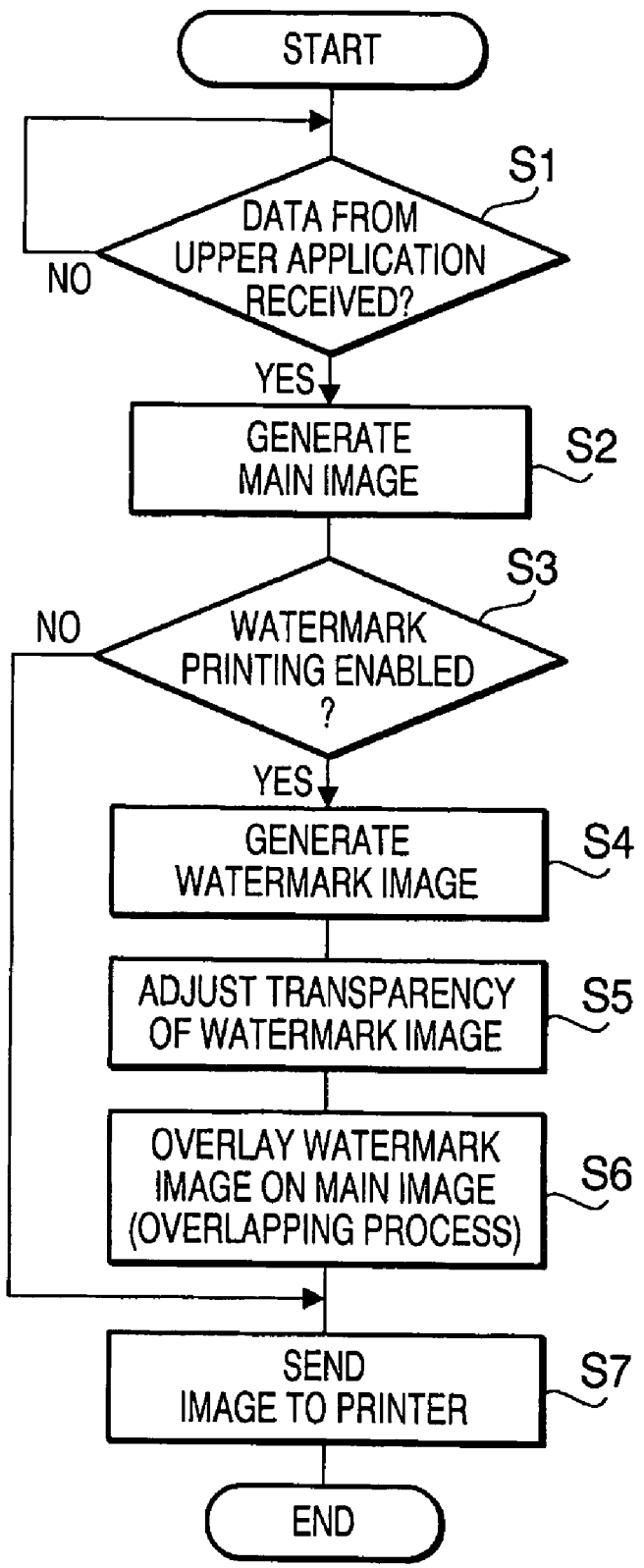
FIG. 3 is a flowchart illustrating a print process.

FIG. 3 is a flowchart illustrating the print process executed by the printer driver 8P. First, the printer driver 8P judges whether document data, which is provided from the application 8A to print out the document when the application 8A finishes generating the document data, is received (step S1). If the document data is received (S1: YES), the main image generation unit 81 generates print data (for example, in a form of bitmap data) of a main image to be printed based on the received document data (step S2).

The watermark image setting unit 82 operates to allow a user to make settings for the watermark printing function (e.g., settings as to whether to execute watermark printing and parameters regarding the watermark printing function) through the operation unit 6. In step S3, the watermark image setting unit 82 judges whether execution of watermark printing is enabled. If the execution of watermark printing is enabled (S3: YES), the watermark image setting unit 82 generates watermark image data (for example, in a form of bitmap data) using the watermark image data 35 containing various types of data, such as fonts and patterns, necessary for generation of watermark images (step S4). As described later, the function of the watermark image setting unit 82 may be achieved on a property window allowing the user to make settings for watermark printing through the operation unit 6.

Figure 5:
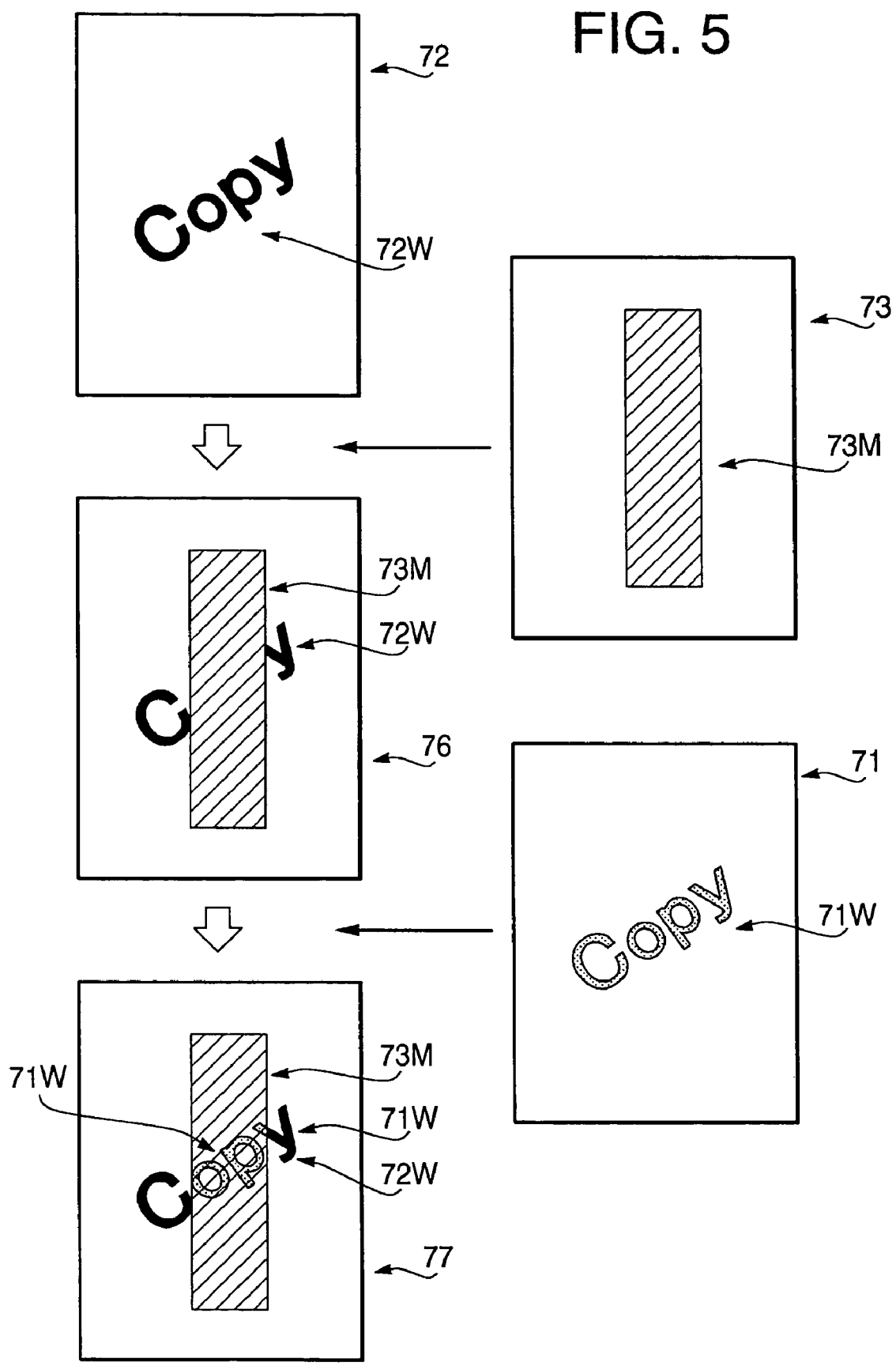
FIG. 5 illustrates an example of image processing executed by the printer driver shown in FIG. 2.

Next, in step S5, the transparency adjustment unit 83 executes a transparency adjustment process on the watermark image data provided by the watermark image setting unit 82 as illustrated in FIG. 5. In FIG. 5, a reference number "73M" is assigned to the main image. More specifically, as shown in FIG. 5, the transparency adjustment unit 83 generates data of an image 71W having first transparency (hereafter, referred to as a first transparency watermark image 71W) and data of an image 72W having second transparency lower than the first transparency (hereafter, referred to as a second transparency watermark image 72W) based the watermark image data.

Figure 6A:
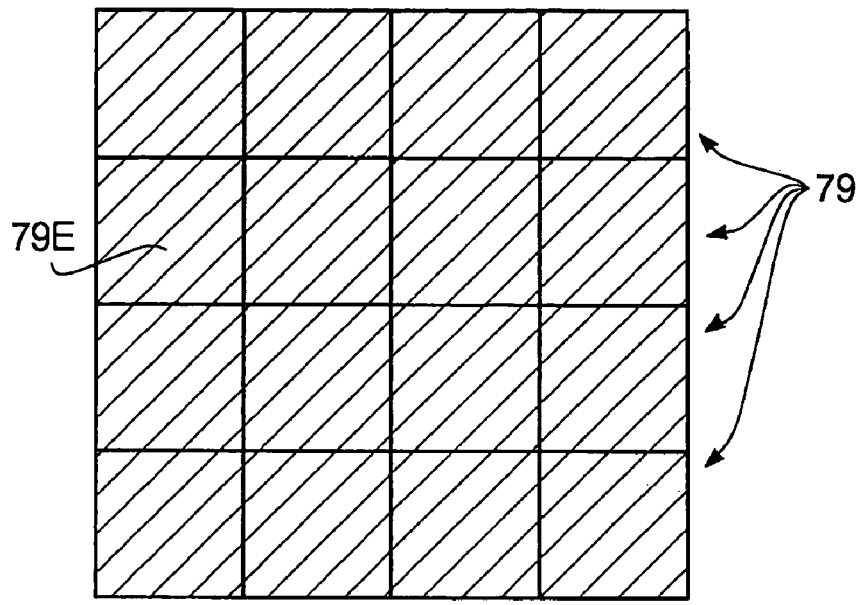
FIGS. 6A and 6B are explanatory illustrations concerning a transparency process.
Figure 6B:
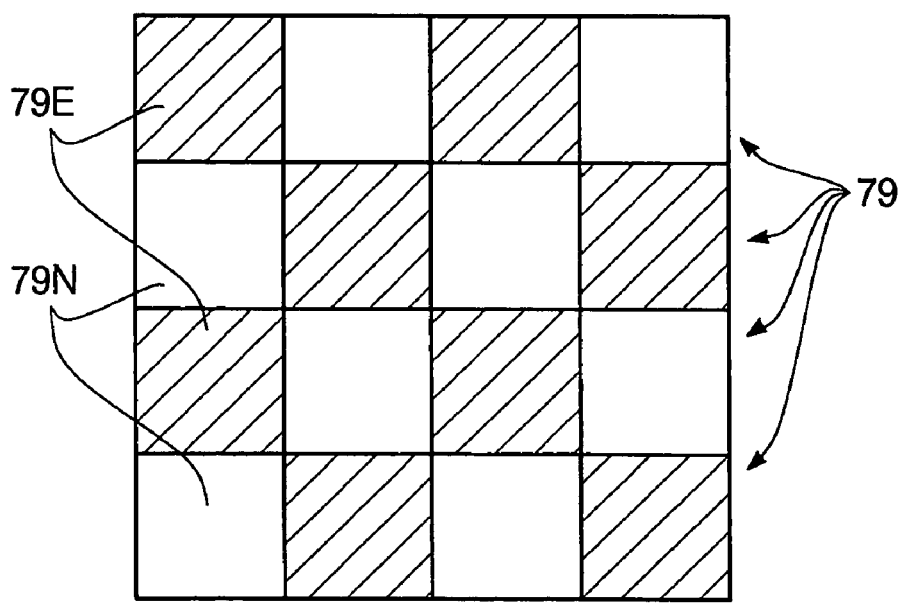

For example, the transparency adjustment process is executed as follows. As shown in FIG. 6A, all dots 79 of the watermark image are filled in black (filled dots are assigned "79E" in FIGS. 6A and 6B). A state of the image shown in FIG. 6A corresponds to transparency of 0% (i.e., density of 100%). By the transparency adjustment process, transparency is increased by thinning out the filled dots 79E (i.e., by replacing a part of the filled dots with unfilled dots 79N). FIG. 6B illustrates an example of a thinned-out image having transparency of 50%. In the example of FIG. 6B, the number of filled dots 79E is equal to the number of unfilled dots 79N, and the unfilled dots 79N are arranged in a staggered configuration. When an adjusted image (an image which is adjusted its transparency) is overlaid on a base image, colors of the base image appears on the unfilled dots 79N of the adjusted image.

In this embodiment, the transparency adjustment unit 83 executes the transparency adjustment process only for the first transparency watermark image 71W, but does not execute the transparency adjustment process for the second transparency watermark image 72W (i.e., the transparency adjustment unit 83 keeps transparency of 0% of the second transparency watermark image 72W unchanged). Although FIG. 2 is illustrated so that two watermark images 71W and 72W are passed from the transparency adjustment unit 83 to the overlap processing unit 84, the second transparency watermark image 72W may be directly passed from the watermark image setting unit 82 to the overlap processing unit 84 if the transparency of the second transparency watermark image 72W is not changed (i.e., if the watermark image is used as the second transparency watermark image 72W).

Figure 4:
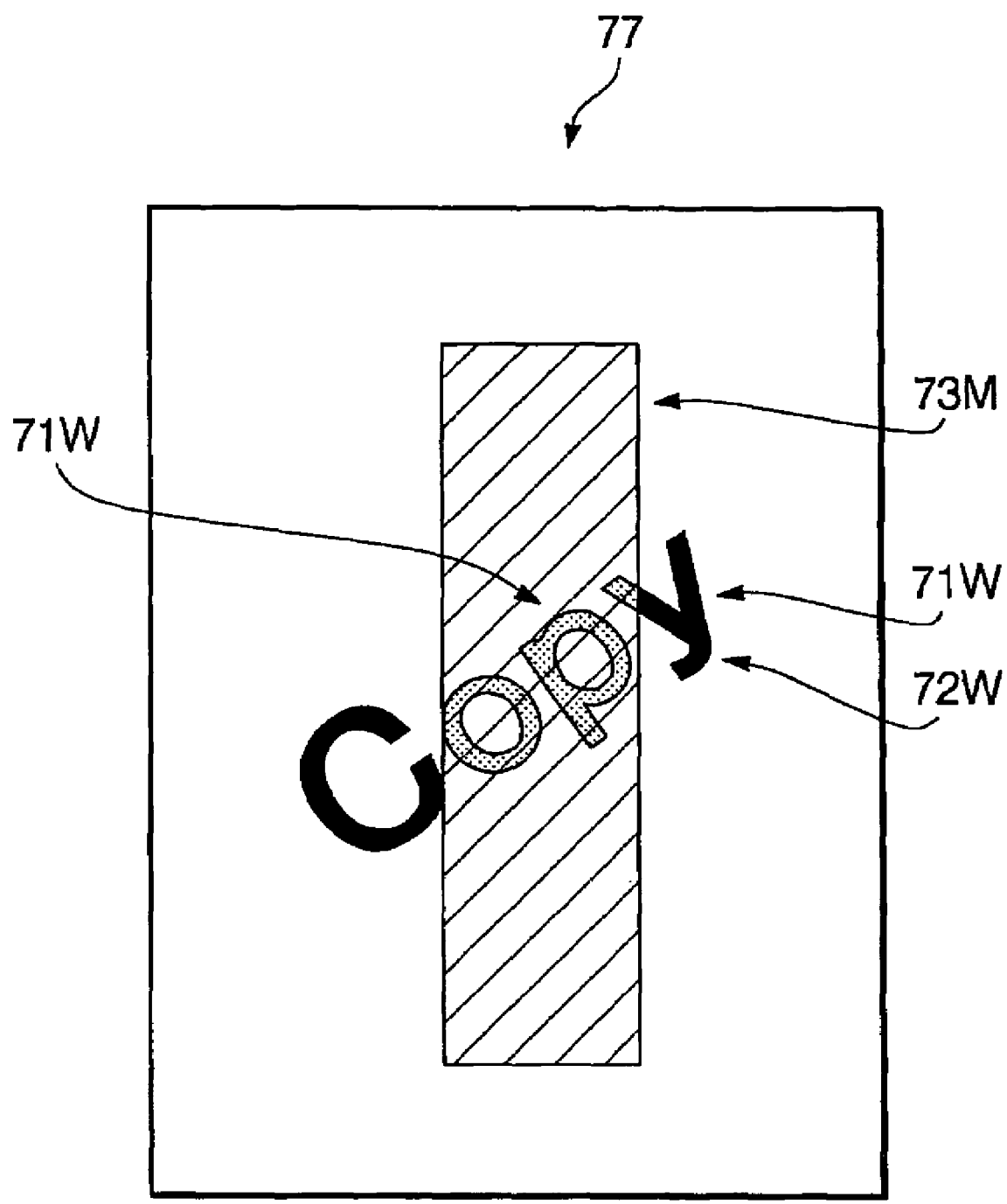
FIG. 4 illustrates an example of an overlap image of a main image and a watermark image.

As shown in FIG. 5, the second transparency watermark image 72W, the main image 73M and the first transparency watermark image 71W are stacked in this order. That is, the overlap processing unit 84 overlays the main image 73M on the second transparency watermark image 72W, and then overlays the first transparency watermark image 72W on the main image 73M (step S6). Consequently, an overlap image 77 of the first and second transparency watermark images 71W and 72W and the main image 73M is generated (see FIGS. 4 and 5). The overlap image 77 is then transmitted to the printer 91 through the transmission unit 85 (step S7). Although in FIG. 5 generation of the overlap image 77 is described step by step using an intermediate image 76, in practice the overlap image 77 can be obtained directly from the three images 71W, 72W and 73M.

In FIG. 5, filled dot parts of a main image 73, a watermark image 71 having first transparency, and a watermark image 73 having second transparency are respectively called the "main image", the "first transparency watermark image" and the "second transparency watermark image", although in practice the first transparency watermark image 71W, the second transparency watermark image 72W and the main image 73W are respectively treated as images 71, 72 and 73 including a filled dot part (i.e., the image 71W, image 72W, or the main image 73) and an unfilled dot part. By overlaying the main image 73 on the second transparency watermark image 72W, the intermediate image 76 in which a part of the second transparency watermark image 72W is covered with the main image 73M is generated.

Next, the first transparency watermark image 71W is overlaid on the intermediate image 76. Since the first transparency watermark image 71W which underwent the transparency adjustment process is overlaid on the main image 73M, both of the main image 73M and the first transparency watermark image 71W are recognizable in an overlap part of the main image 73M and the first transparency watermark image 71W. In a region of a part of the second transparency watermark image 72W not overlapping with the main image 73M (i.e., in a non overlap part), the density of the second transparency watermark image 72W is reflected because in the region the first transparency watermark image 71W which underwent the transparency adjustment process is overlain on the second transparency watermark image 72W. Consequently, a watermark having a light color in the overlap part and having a dark color in the non-overlap part can be obtained.

Figure 7:
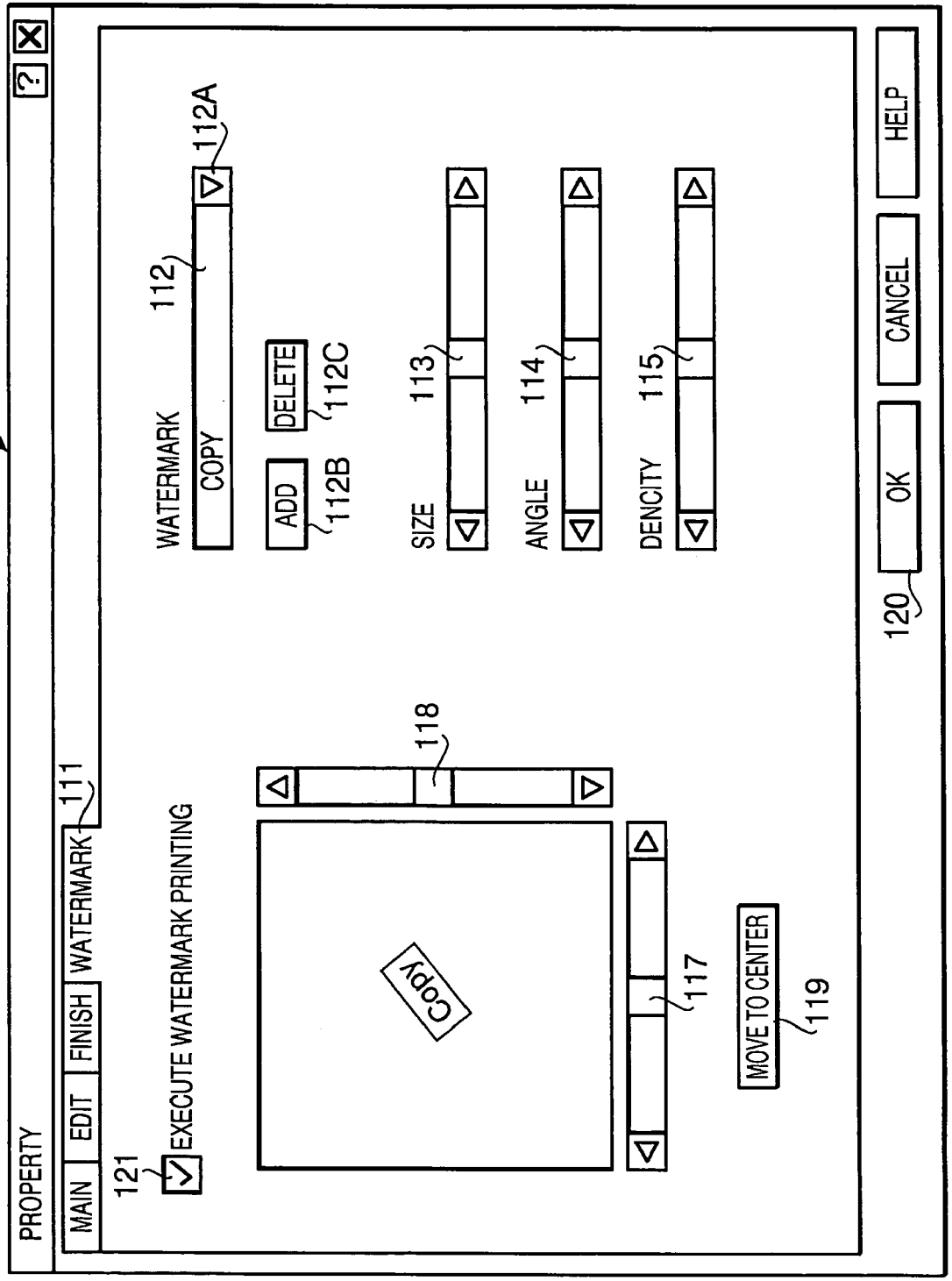
FIG. 7 illustrates a property setting interface to make setting for watermark printing.

Hereafter, the setting process is explained with reference to FIG. 7. In the setting process, the watermark image setting unit 82 generates a property setting interface (window) 110 having a watermark tab 111 allowing the user to make settings of the watermark printing function through the operation unit 6. In the watermark tab 111, a selection field 121 to designate whether to execute the watermark printing, setting fields 112 to 119 concerning parameters of the watermark printing function, and an OK button 120 to apply the inputted settings are included. The setting field 112 is used to input an indication to be formed as a watermark. The setting field 113 is used to set the size of the watermark. The setting field 114 is used to set an inclination angle of the watermark with respect to the horizontal direction. The setting field 115 is used to input the density of the watermark. The setting fields 117 to 119 are used to adjust the position of the watermark on a sheet.

Since in the embodiment the printer driver 8P is configured to support the transparency adjustment process only for adjusting the first transparency of the first transparency watermark image 71W, the adjustment of the density through the input field 115 of the watermark tab 111 is only applied to the first transparency of the first transparency watermark image 71W.

Figure 8:
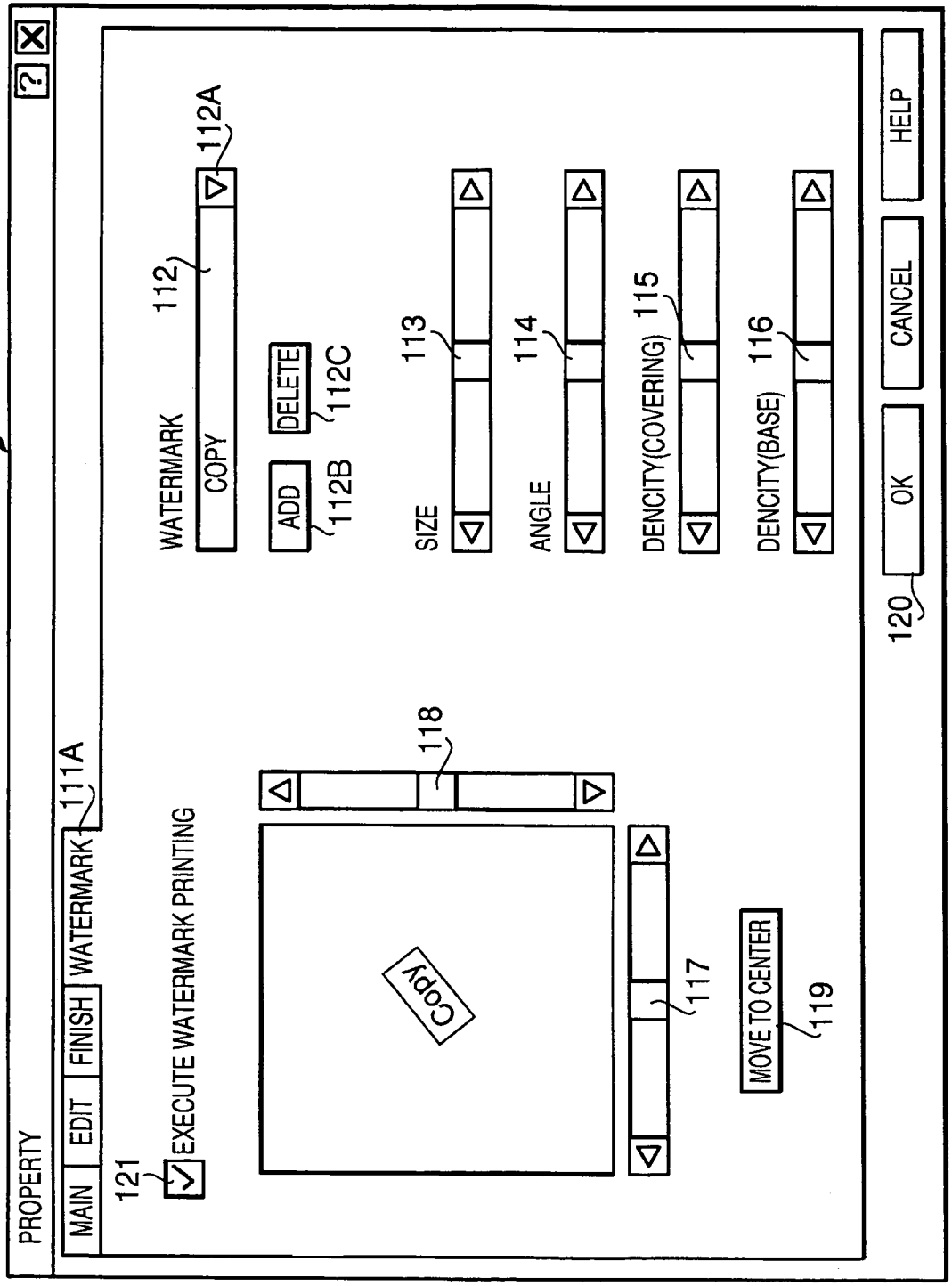
FIG. 8 is another example of a property setting interface to make setting for watermark printing.
Figure 9A:
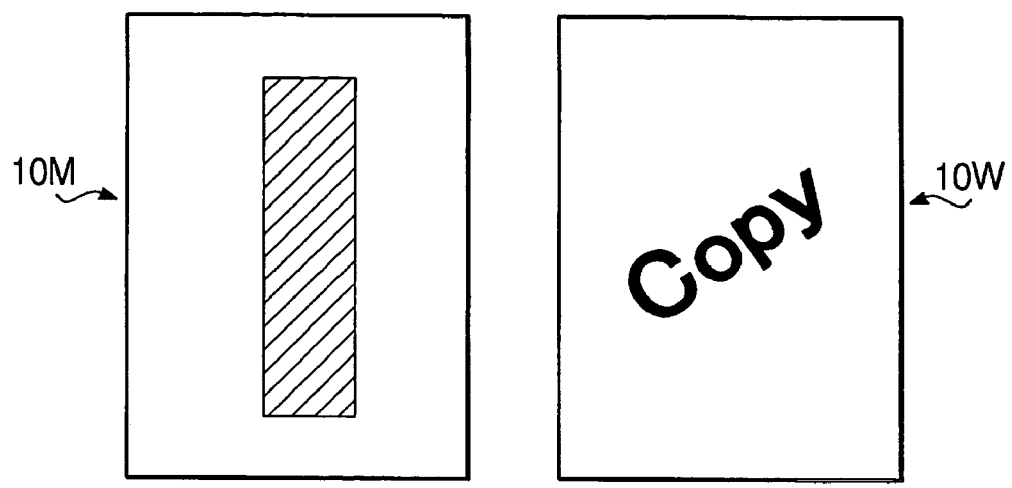
FIGS. 9A to 9C are explanatory illustrations concerning a conventional watermark printing function.
Figure 9B:
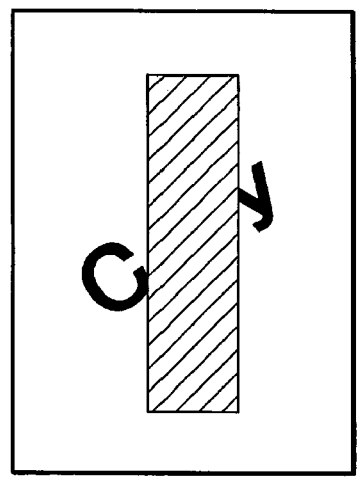
Figure 9C:
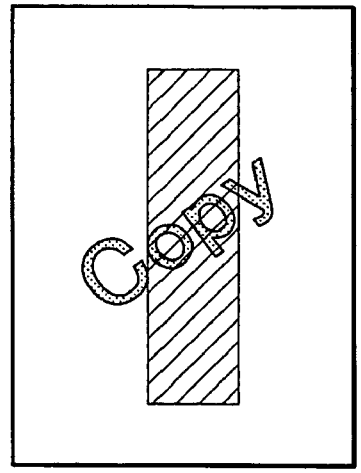

FIG. 8 shows an another example of a property setting interface allowing the user to designate both of the transparency of the first transparency watermark image 71 (71W) and the transparency of the second transparency watermark image 72 (72W). In a watermark tab 111A of a property setting interface 110A shown in FIG. 8, the input field 115 is used to designate the transparency of the first transparency watermark image 71 (71W) (a covering pattern), and an input field 116 is used to designate the transparency of the second transparency watermark image 72 (72W) (a base pattern).

Although the present invention has been described in considerable detail with reference to certain preferred embodiments thereof, other embodiments are possible.

The watermark tab may be configured such that an input field for one of the first transparency and second transparency is placed on the watermark tab and the other transparency is determined so that a predetermined difference is kept between the first transparency and second transparency.

What is claimed is:

1. An information processing device, comprising:
    a transparency adjustment unit to adjust transparency of a watermark image which is to be added to a main image to prepare data of a first image having first transparency and data of a second image having second transparency, wherein each of the first and second images corresponds to the watermark image and the first transparency of the first image is higher than the second transparency of the second image;
    an overlap processing unit to generate data of an overlap image of the main image, the first image and the second image such that the second image, the main image and the first image overlap with each other in bottom-to-top order;
    an operation unit to accept a user input; and
    a watermark image setting unit to change data of the first transparency of the first image and the second transparency of the second image in accordance with the user input through the operation unit.

2. The information processing device according to claim 1, further comprising:
    a transmission unit to transmit the data of the overlap image to an external printer through a network.

3. The information processing device according to claim 1, wherein:
    the second image having the second transparency is equal to the watermark image of whichever transparency is not processed by the transparency adjustment unit.

4. A computer usable medium having computer readable instructions stored thereon, which, when executed by a computer, are configured to:
    adjust transparency of a watermark image which is to be added to a main image to prepare data of a first image having first transparency and data of a second image having second transparency, wherein each of the first and second images corresponds to the watermark image and the first transparency of the first image is higher than the second transparency of the second image;
    generate data of an overlap image of the main image, the first image and the second image such that the second image, the main image and the first image overlap with each other in bottom-to-top order;
    accept a user input; and
    change data of the first transparency of the first image and the second transparency of the second image in accordance with the user input.

5. The computer usable medium according to claim 4 wherein when the instructions are executed by the computer, the instructions are further configured to transmit the data of the overlap image to an external printer through a network.

6. The computer usable medium according to claim 4 wherein the second image having the second transparency is equal to the watermark image of whichever transparency is not adjusted.

* * * * *